United States Patent
Chen et al.

(10) Patent No.: US 8,502,770 B2
(45) Date of Patent: Aug. 6, 2013

(54) DISPLAY DEVICE, CONTROLLING METHOD AND DISPLAY SYSTEM THEREOF

(75) Inventors: Chao-Hung Chen, Hsinchu Hsien (TW); Yu-Fen Tsai, Hsinchu Hsien (TW); Yu-Wen Huang, Hsinchu Hsien (TW)

(73) Assignee: Egalax_Empia Technology Inc., Taipei (TW)

( * ) Notice: Subject to any disclaimer, the term of this patent is extended or adjusted under 35 U.S.C. 154(b) by 1048 days.

(21) Appl. No.: 12/507,874

(22) Filed: Jul. 23, 2009

(65) Prior Publication Data

US 2010/0214212 A1 Aug. 26, 2010

(30) Foreign Application Priority Data

Feb. 24, 2009 (TW) .............................. 98105855 A

(51) Int. Cl.
G06F 3/02 (2006.01)

(52) U.S. Cl.
USPC ........... 345/156; 345/157; 345/163; 345/169; 348/14.05; 348/734

(58) Field of Classification Search
USPC ....... 345/156–158, 163, 168–169; 348/14.05, 348/734
See application file for complete search history.

(56) References Cited

U.S. PATENT DOCUMENTS

| | | | | |
|---|---|---|---|---|
| 5,900,867 A * | 5/1999 | Schindler et al. | ............. | 715/719 |
| 7,663,509 B2 * | 2/2010 | Shen | ............................... | 341/20 |
| 2005/0104852 A1 * | 5/2005 | Emerson et al. | ............. | 345/157 |
| 2005/0275641 A1 * | 12/2005 | Franz | ............................ | 345/204 |
| 2007/0273655 A1 * | 11/2007 | Yeh et al. | ....................... | 345/169 |
| 2008/0055239 A1 * | 3/2008 | Garibaldi et al. | ............. | 345/156 |
| 2008/0091858 A1 * | 4/2008 | Zhang et al. | ..................... | 710/72 |
| 2008/0192003 A1 * | 8/2008 | Kondo et al. | .................. | 345/156 |
| 2009/0182904 A1 * | 7/2009 | Huston et al. | .................... | 710/11 |
| 2009/0201420 A1 * | 8/2009 | Brown et al. | .................. | 348/552 |
| 2010/0186053 A1 * | 7/2010 | Zhang et al. | ..................... | 725/93 |
| 2010/0194980 A1 * | 8/2010 | Balasubramanian et al. | | 348/552 |
| 2010/0283917 A1 * | 11/2010 | Ueno et al. | ..................... | 348/734 |

FOREIGN PATENT DOCUMENTS

| | | |
|---|---|---|
| CN | 1645344 | 7/2005 |
| CN | 1674647 | 9/2005 |

OTHER PUBLICATIONS

State Intellectual Property Office of the People'S Republic of China, "Office Action", Mar. 3, 2011, China.

* cited by examiner

Primary Examiner — Joe H Cheng
Assistant Examiner — Priyank Shah
(74) Attorney, Agent, or Firm — WPAT, PC; Justin King

(57) ABSTRACT

A display device is provided. The display device includes a command processing unit, a command converting unit, a universal serial bus (USB) interface and a display module. The command processing unit processes a remote-control command from a remote-controller. The command converting unit generates a human interface device (HID) command corresponding to the remote-control command. The USB interface outputs the HID command to an external host which generates an image in response to the HID command. Then the display module displays the image.

8 Claims, 3 Drawing Sheets

DISPLAY DEVICE, CONTROLLING METHOD AND DISPLAY SYSTEM THEREOF

CROSS REFERENCE TO RELATED PATENT APPLICATION

This patent application is based on a Taiwan, R.O.C. patent application No. 98105855 filed on Feb. 24, 2009.

FIELD OF THE INVENTION

The present invention relates to a display device, a control method thereof and a display system having the same, and more particularly, to a display device having a virtual human interface device (HID) function, a control method thereof and a display system using the display device.

BACKGROUND OF THE INVENTION

As technologies develop rapidly, digital household products are becoming more appreciated. Users are able to search for important information or enjoy audio and video (AV) services by connecting computers to the Internet.

However, at present, when wishing to browse information on the Internet, most of the users use a monitor instead of a high definition television (HDTV) to surf the Internet. Therefore, although a user has an HDTV, he/she can not enjoy the AV service on the Internet with the benefit of the HDTV. Accordingly, the industry works on a subject of how to provide multifunctional TVs such that the users can enjoy the higher definition digital service.

SUMMARY OF THE INVENTION

A display device having a virtual HID function, a control method thereof, and a display system having the display device are provided. By operating a remote control of a display device, a user can control a computer connected to the display device. The user can view images and browse information on the Internet via the display device. Therefore, the display device is more competitive in the marketplace by having more digital functions.

A display device capable of connecting to an external host is provided according to the present invention. The display device comprises a command processing unit, a command converting unit, a universal serial bus (USB) interface, and a display module. The command processing unit processes a remote-control command from a remote controller. The command converting unit generates a human interface device (HID) command corresponding to the remote-control command. The USB interface outputs the HID command to the external host, which generates an image in response to the HID command. Then the display module displays the image.

A method for controlling a display device is provided according to the present invention. The method comprises steps of processing a remote-control command from a remote controller, converting the remote-control command to an HID command, outputting the HID command to an external host that generates an image in response to the HID command, and displaying the image.

A display system is provided according to the present invention. The display system comprises a remote control and a display device. The remote controller outputs a remote-control command. The display device comprises a command processing unit, a command converting unit, a USB interface and a display module. The command processing unit processes the remote-control command. The command converting unit converts the remote-control command to an HID command. The USB interface outputs the HID command to an external host, which generates an image in response to the HID command. Then the display module displays the image.

Following description and figures are disclosed to gain a better understanding of the advantages of the present invention.

DETAILED DESCRIPTION OF THE PREFERRED EMBODIMENT

A display device, a control method thereof and a display system having the display device are provided. The display device is capable of connecting to an external host. The display device comprises a command processing unit, a command converting unit, a bus interface, and a display module. The command processing unit processes a remote-control command from a remote controller. The command converting unit generates an HID command corresponding to the remote-control command. The bus interface, such as the Universal Serial Bus (USB), outputs the HID command to the external host, which generates an image in response to the HID command. Then the display module displays the image. The display system comprises the foregoing display device and remote controller. The invention will be apparent from the following description of embodiments.

Figure 1:
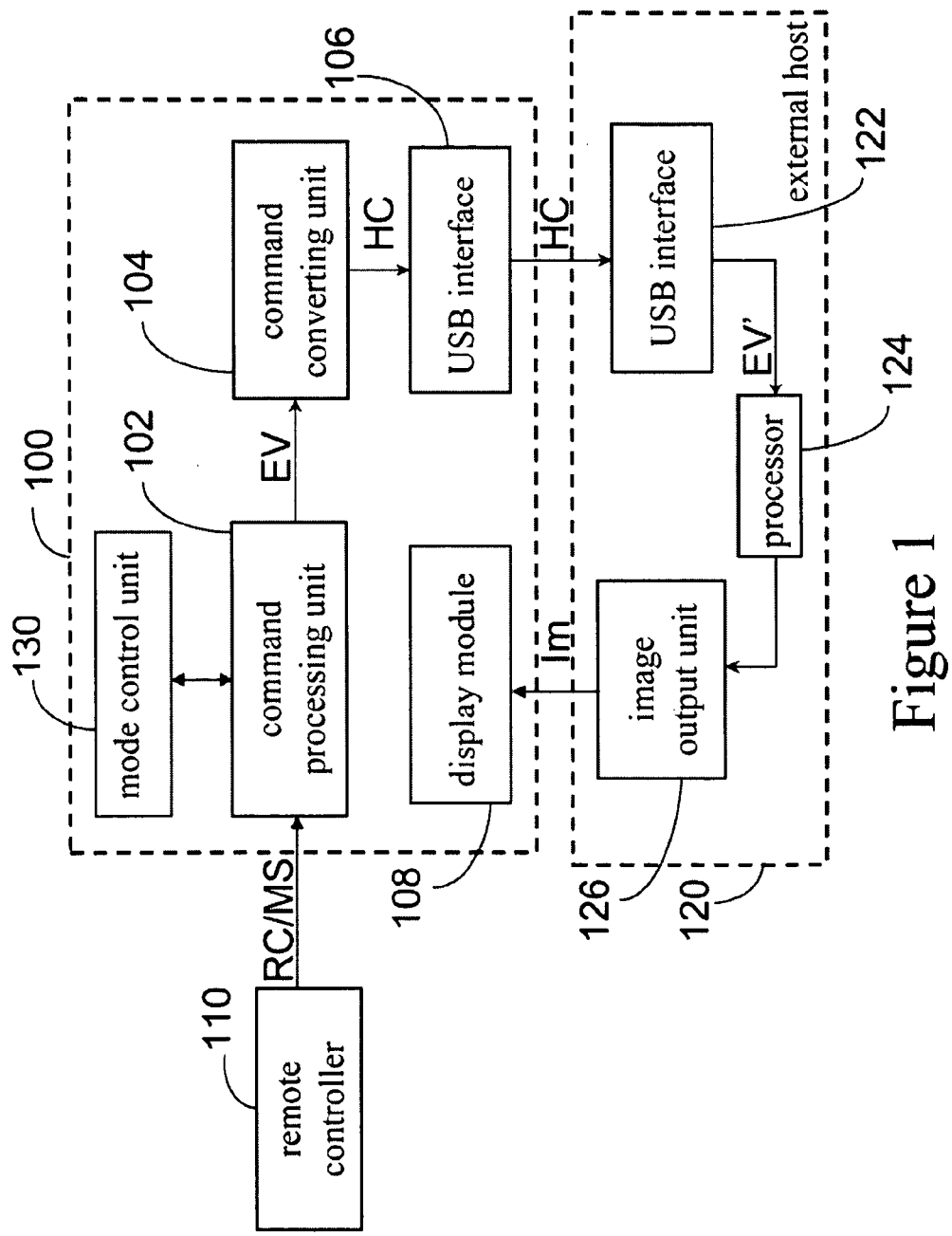
FIG. 1 is a block diagram of a display device in accordance with a first embodiment of the present invention.

FIG. 1 is a block diagram of a display device in accordance with a first embodiment of the present invention. A display device 100 comprises a command processing unit 102, a command converting unit 104, a USB interface 106, a display module 108, and a mode control unit 130. The command processing unit 102 receives a remote-control command RC from a remote controller 110. The mode control unit 130 determines whether to allow the command converting unit 104 to generate an HID command HC according to a mode switch command MS from the remote controller 110. The command converting unit 104 generates the HID command HC corresponding to the remote-control command RC. The USB interface 106 outputs the HID command HC to an external host 120. Then the display module 108 displays the image generated by the external host 120 in response to the HID command HC.

The remote controller 110 according to this embodiment has a mode selection button for generating the mode switch command MS to switch the mode control unit 130 between a first mode such as a display device mode and a second mode such as an external host mode.

For example, when the mode control unit 130 is in the first mode, the command converting unit 104 is disabled. When the mode control unit 130 is in the second mode, the command converting unit 104 is enabled.

Another approach is described below. When the mode control unit 130 is in the first mode, the command processing unit 102 is disabled from outputting information to the command converting unit 104. When the mode control unit 130 is in the second mode, command processing unit 102 is enabled for outputting information to the command converting unit 104.

In this embodiment, the remote controller 110 is a simple type of remote controller having several buttons. Most of the buttons can be used to control the display device 100 and the external host 120. The buttons of the remote controller 110 are switched to control the display device 100 or the external host 120 via the mode selection button of the remote controller 110.

Figure 2:
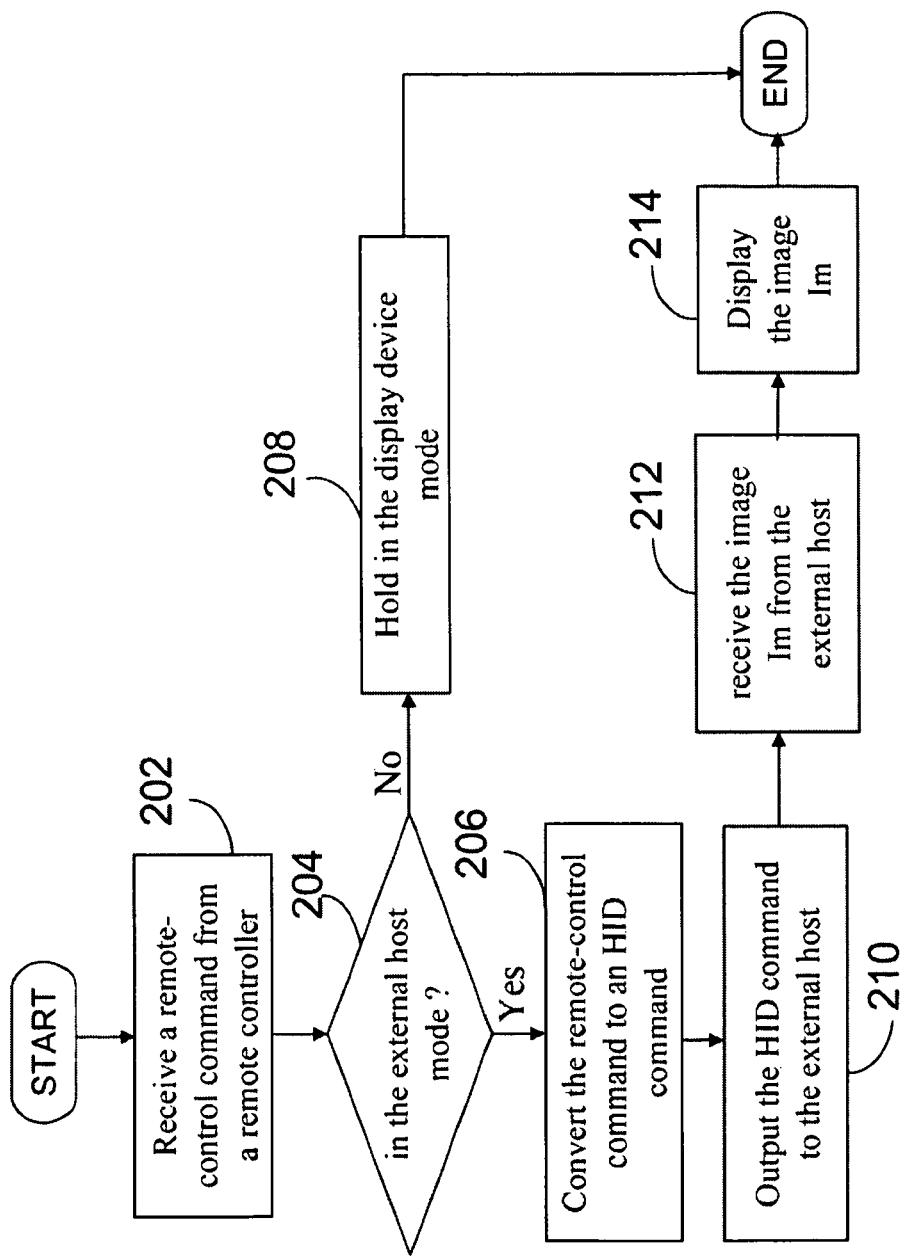
FIG. 2 is a flow chart of a method for controlling a display device according to the first embodiment as illustrated in FIG. 1.

The display device 100 in accordance with the first embodiment of the present invention is further described with reference to FIG. 1 and FIG. 2. FIG. 2 is a flow chart of a method for controlling a display device according to the first embodiment as illustrated in FIG. 1. In the foregoing embodiment, the display device 100 is a TV, and the external host 120 is a computer.

For example, the remote controller 110 is an infrared (IR) remote controller, and the command converting unit 104 converts an IR remote-control command to an HID command HC. The remote controller 110 further comprises a mouse pointer, which can be implemented with a mouse wheel, direction buttons, or certain buttons of the remote controller 110.

In Step 202, when the buttons or the mouse pointer is operated by a user, the remote controller outputs a remote-control command RC to the command processing unit 102 in a wireless manner. For example, the remote controller 110 transmits the remote-control command RC by outputting an IR message, and the command processing unit 102 processes the remote-control command RC from the remote controller 110. For another example, the command processing unit 102 decodes instruction codes in the IR message to generate a corresponding event EV, and outputs the corresponding event EV to the command converting unit 104.

When the remote-control command RC is generated by pressing the buttons, the command processing unit 102 generates a button press event. When the remote-control command RC is generated by the mouse pointer, the command processing unit 102 then generates a mouse pointer control event.

In Step 204, it is determined that whether the display device 100 is in the external host mode. When the answer is yes, Step 206 is performed; otherwise, Step 208 is performed. In this embodiment, the mode control unit 130 records the current mode of the display device 100 according to a mode switch command MS from the remote controller 110. Then, the current mode of the display device 100 can be determined according to information recorded by the mode control unit 130.

In Step 206, the command converting unit 104 converts the event EV to an HID command HC to be outputted to the USB interface 106. The HID command HC is a command of an HID such as a mouse or a keyboard. For example, the command converting unit 104 applies a lookup table method, a software algorithm, or a hardware circuit to generate the corresponding HID command HC mapping to the event.

In Step 210, the USB interface 106 coverts the HID command HC to a USB packet to be transmitted to the USB interface 122 of the external host 120. The USB interface 122 converts the USB packet to a corresponding event EV' to be outputted to a processor 124. The processor 124 correspondingly controls an image output unit 126 to output a corresponding image Im in response to the event EV'. Then, the display module 108 receives the image Im from the external host 120 and displays the received image Im, as shown in the Step 212 and 214.

In Step 208, when the display device 100 is in the display device mode, the display device 100 shall respond to the button press event generated when various buttons of the remote controller 110 are operated by a user. However, the display device 100 shall not respond to the mouse pointer control event generated when the mouse pointer is operated by the user. In other words, when the display device 100 is in the display device mode, the mode control unit 130 disables the command converting unit 104, or controls the command processing unit 102 to stop outputting the information to the command converting unit 104.

As mentioned above, when the display device 100 is in the external host mode, the user can operate the remote controller 110 that serves as a keyboard or mouse of the external host 120 so as to generate an event for controlling the external host 120. That is, the user can operate several buttons of the remote controller 110 to perform operations similar to those of the keyboard. Further, the buttons of the remote controller 110 are specially designed. For example, pressing the same button for different numbers of times shall correspond to different buttons of the keyboard, thereby providing most functions of the keyboard. The user also can operate the mouse pointer of the remote controller 110 similarly to operate the mouse. At this point, the external host 120 regards the display device 100 as a virtual HID, such as a virtual keyboard or mouse. When the display device 100 is in the display device mode, the remote controller 110 is used for controlling the display device 100 to display other video signals received from sources other than the external host. For example, the display device 100 displays a TV program. At this time, the display device does not serve as the virtual HID.

Therefore, when the display device 100 is in the external host mode, the display device 100 is also regarded as an external screen of the external host 120 and is controlled by the remote controller 110. The user can operate the remote controller 110 to control the external host 120. For example, the external host 120 is controlled to connect to the Internet, so as to browse web pages, view video information on the Internet, or operate the external host 120 to perform application programs. The foregoing image can be an image of a web browser or an application program.

For example, when the application program is a video playing program, the user can play video files such as movies stored in the external host 120 via the video playing program, or play video files downloaded from the Internet to enjoy a high definition view.

In one embodiment, the processor 124 of the external host 120 processes the received event EV' accordingly to the operating system (OS) on the external host 120, and an application program of which then responds to the event EV'. An image generated during the response process shall be transmitted to the display module 108 of the display device 100 via the image output unit 126, so as to display the image on the screen of the display device 100.

In addition, in this embodiment, it is also designed that, when the display device 100 is in the external host mode, the remote controller 110 has an integrated function of controlling both the display device 100 and controlling the external host 120.

The display module 108 can simultaneously display a main screen and a sub screen. The main image displays the video signals received from sources other than the external host 120. For example, the main screen displays an image of a TV program. The sub screen displays the image generated by the external host 120 when the external host 120 responds to the HID command HC.

Figure 3:
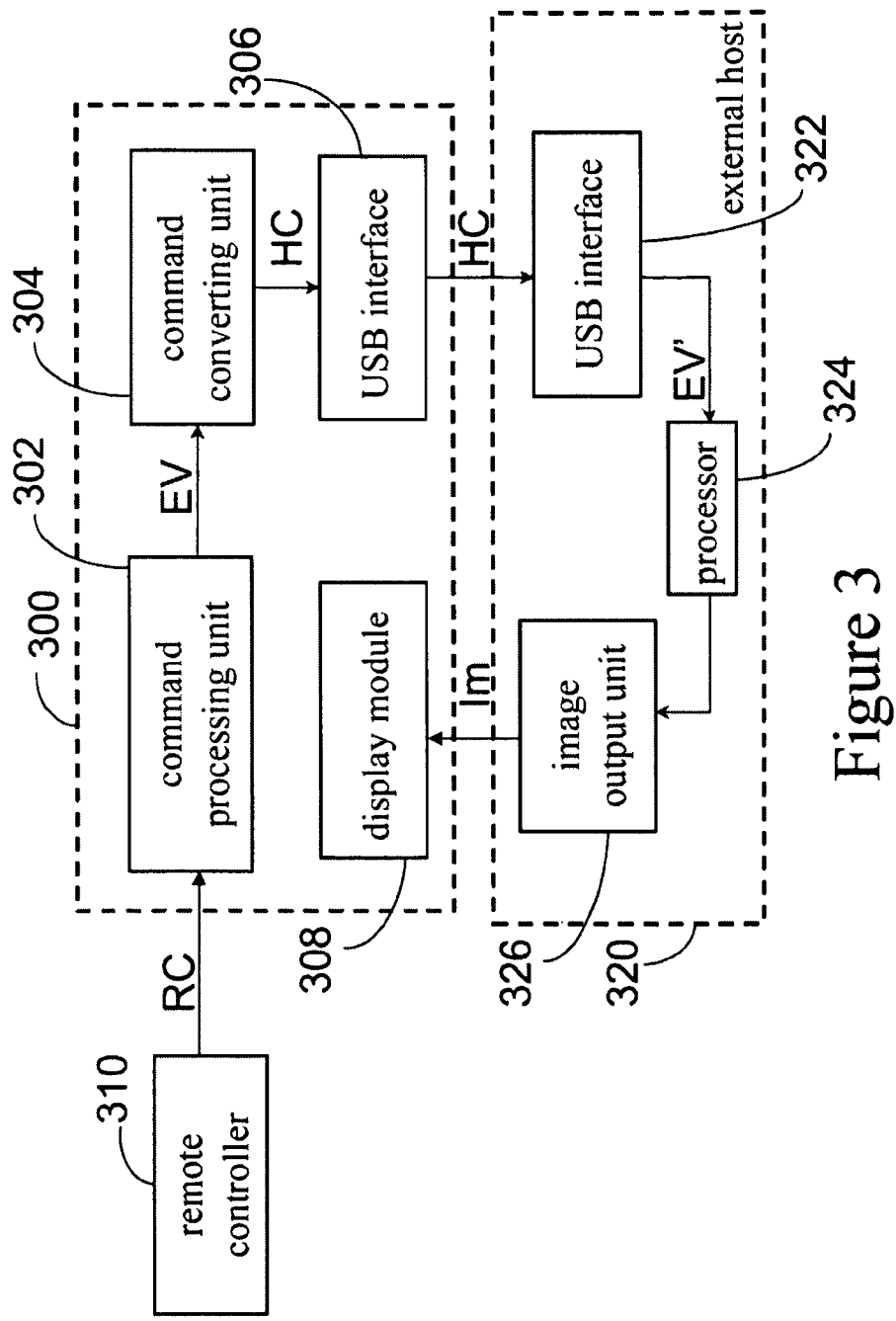
FIG. 3 is a block diagram of a display device in accordance with a second embodiment of the present invention.

FIG. 3 is a block diagram of a display device in accordance with a second embodiment of the present invention. The display device 300 comprises a command processing unit 302, a command converting unit 304, a USB interface 306 and a display module 308. Being different from the first embodiment, the display device 300 does not comprise any mode control unit, and the corresponding remote controller is different.

In this embodiment, a remote controller 310 comprises a plurality of first-type buttons and a plurality of second-type buttons. The first-type buttons are used to control the display device 300 and the second-type buttons are used to control an external host 320. When the command processing unit 302 receives a remote-control command RC from the second-type buttons of the remote controller 310, the command processing unit 302 outputs an event EV representing the processed remote-control command RC to the command converting unit 304. According to the event EV, the command converting unit 304 generates a corresponding HID command HC to be transmitted to the external host 320 via the USB interface 306. When the display device 300 receives the remote-control RC generated by the first-type buttons of the remote controller 310, the HID command HC need not be generated.

In this embodiment, for that the buttons of the remote controller 310 are divided into buttons for controlling the display device 300 and for controlling the external host 320, the remote controller 310 does not need a mode selection button and the display device 300 does not need a mode control unit.

According to another application of this embodiment, the remote controller 310 has a mode switch function. In different modes, the same button outputs different commands to control the display device 300 or the external host 320.

According to the foregoing display device, the control method thereof and the display system having the same, by operating a remote controller of a display device, the user can manipulate an external host connected to the display device. Therefore, the display device serves as not only a virtual HID of the external host but also a screen for displaying an image of the external host. Thus, the user can view the image generated when the external host performs an application program, enjoy a video program provided by the external host, or browse information on the Internet via the display device. Therefore, the display device is made more competitive in the marketplace by being more digitally versatile.

While the invention has been described in terms of what are presently considered to be the most practical and preferred embodiments, it is to be understood that the invention needn't limit to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A display device, capable of connecting to an external host, comprising:
    a command processing unit, for processing a remote-control command from a remote controller;
    a command converting unit, for generating a human interface device (HID) command corresponding to the remote-control command;
    a mode control unit, for determining whether to allow the command converting unit to generate the HID command according to a mode switch command from the remote controller;
    a universal serial bus (USB) interface, for outputting the HID command to the external host; and
    a display module, for displaying the image;
    wherein the external device generates an image in response to the HID command;
    wherein the remote controller comprises a mode selection button for generating the mode switch command to switch the mode control unit between a first mode and a second mode;
    wherein the command converting unit is disabled when the mode control unit is in the first mode and is enabled when the mode control unit is in the second mode.

2. A display device, capable of connecting to an external host, comprising:
    a command processing unit, for processing a remote-control command from a remote controller;
    a command converting unit, for generating a human interface device (HID) command corresponding to the remote-control command;
    a mode control unit, for determining whether to allow the command converting unit to generate the HID command according to a mode switch command from the remote controller;
    a universal serial bus (USB) interface, for outputting the HID command to the external host; and
    a display module, for displaying the image;
    wherein the external device generates an image in response to the HID command;
    wherein the remote controller comprises a mode selection button for generating the mode switch command to switch the mode control unit between a first mode and a second mode;
    wherein the command processing unit is disabled from outputting information to the command converting unit when the mode control unit is in the first mode, and the command processing unit is enabled for outputting information to the command converting unit when the mode control unit is in the second mode.

3. The display device as claimed in claim 2, wherein the remote controller is an infrared controller, and the command converting unit is for converting an infrared control command to the HID command.

4. A method for controlling a display device, comprising:
    receiving a remote-control command from a remote controller, wherein the remote controller comprises a mode selection button for generating a mode switch command to switch a mode control unit of the display device between a first mode and a second mode;
    generating an HID command corresponding to the remote-control command by a command converting unit, and determining whether to generate the HID command according to the mode switch command from the remote controller;
    outputting the HID command to an external host, which generates an image in response to the HID command;
    displaying the image; and
    disabling the command converting unit when the mode control unit is in the first mode and enabling the command converting unit when the mode control unit is in the second mode.

5. The method as claimed in claim 4, wherein the remote controller is an infrared remote controller, and the step of generating the HID command corresponding to the remote-control command comprises converting an infrared-control command to the HID command.

6. The method as claimed in claim 4, wherein the remote controller comprises a plurality of first-type buttons for controlling the display device, and a plurality of second-type buttons for controlling the external host.

7. The method as claimed in claim 4, wherein the HID command is outputted to the external host via a USB interface.

8. A display system, comprising:
a remote controller, for outputting a remote-control command; and
a display device, coupled to an external host, comprising:
  a command processing unit, for processing the remote-control command;
  a mode control unit, for determining whether to allow the command converting unit to generate the HID command according to a mode switch command of the remote controller;
  a command converting unit, for generating an HID command corresponding to the remote-control command;
  a USB interface, for outputting the HID command to the external host; and
  a display module, for displaying the image;
wherein the external host generates an image in response to the HID command;
wherein the remote controller comprises a mode selection button for generating the mode switch command to switch the mode control unit between a first mode and a second mode;
wherein the command processing unit is disabled from outputting information to the command converting unit when the mode control unit is in the first mode, and the command processing unit is enabled for outputting the information to the command converting unit when the mode control unit is in the second mode.

* * * * *